United States Patent
Gao et al.

(10) Patent No.: US 12,164,702 B2
(45) Date of Patent: Dec. 10, 2024

(54) ELECTRONIC DEVICE OPERATING METHOD AND ELECTRONIC DEVICE

(71) Applicant: Lenovo (Beijing) Limited, Beijing (CN)

(72) Inventors: Ying Gao, Beijing (CN); Xiaoren Cheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 125 days.

(21) Appl. No.: 17/691,818

(22) Filed: Mar. 10, 2022

(65) Prior Publication Data
US 2023/0091663 A1   Mar. 23, 2023

(30) Foreign Application Priority Data
Sep. 17, 2021   (CN) .......................... 202111094171.1

(51) Int. Cl.
*G06F 3/00*   (2006.01)
*G06F 3/023*   (2006.01)
*G06F 3/0354*   (2013.01)

(52) U.S. Cl.
CPC .......... *G06F 3/0233* (2013.01); *G06F 3/0238* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 2007/0124694 A1* | 5/2007 | Van De Sluis | G06F 3/048 715/775 |
| 2011/0296333 A1* | 12/2011 | Bateman | G06F 3/04883 345/173 |
| 2014/0191972 A1* | 7/2014 | Case | G06F 3/0213 345/168 |
| 2015/0109237 A1* | 4/2015 | Liang | G06F 3/04886 345/174 |
| 2015/0309663 A1* | 10/2015 | Seo | G06F 3/0418 345/175 |
| 2016/0253044 A1* | 9/2016 | Katz | G06F 3/017 345/156 |
| 2017/0336963 A1* | 11/2017 | Lee | G06F 3/017 |
| 2018/0164910 A1* | 6/2018 | Ent | G06F 3/018 |
| 2020/0192497 A1* | 6/2020 | Knoppert | G06F 3/0412 |
| 2020/0272268 A1* | 8/2020 | Shin | G06F 3/0416 |

FOREIGN PATENT DOCUMENTS

GB   2509599 A * 7/2014 ............. G06F 3/017

\* cited by examiner

*Primary Examiner* — Martin Mushambo
(74) *Attorney, Agent, or Firm* — ANOVA LAW GROUP, PLLC (57) ABSTRACT

An electronic device operating method applied to an electronic device. The method includes obtaining hand operation information at least related to a posture of an operator, determining an operation mode of the operator based on the hand operation information, and directing the electronic device to a state corresponding to the operation mode based on an association relationship between the operation mode and a preset operation function of the electronic device.

18 Claims, 5 Drawing Sheets

ELECTRONIC DEVICE OPERATING METHOD AND ELECTRONIC DEVICE

CROSS-REFERENCES TO RELATED APPLICATION

This application claims priority to Chinese Patent Application No. 202111094171.1 filed on Sep. 17, 2021, the entire content of which is incorporated herein by reference.

FIELD OF TECHNOLOGY

The present disclosure relates to the technical field of information processing and, more specifically, to an electronic device operating method and an electronic device.

BACKGROUND

Most electronic devices such as desktop computers, laptop computers, etc. require users to operate by hand, such as the user's finger pressing the keyboard for input operations. However, the control of the electronic device that user can achieve through the hand operations is relatively limited, and the hand operations are not associated with various functions and states of the electronic device, which fails to provide a better interactive environment for the user.

In the field of laptop computers, the current laptop computer keyboards mainly include physical keyboards and virtual keyboards. The virtual keyboards are mostly used in the field of dual-screen laptop computers. The system side and the display side of the dual-screen laptop computer have independent display areas, which can provide users with a better interactive environment. However, the display area of the system side of the dual-screen laptop computer has not been well-utilized, especially in the case where the user needs to manually switch the input mode of the keyboard, which is no different from the switching operation of a single-screen laptop computer, and the user needs to manually perform the switch, which increases the burden of the user's operation.

BRIEF SUMMARY OF THE DISCLOSURE

One aspect of the present disclosure provides an electronic device control method. The electronic device operating method includes obtaining hand operation information at least related to a posture of an operator, determining an operation mode of the operator based on the hand operation information, and directing the electronic device to a state corresponding to the operation mode based on an association relationship between the operation mode and a preset operation function of the electronic device.

Another aspect of the present disclosure provides an electronic device. The electronic device includes a touchpad and a processor. The touchpad is configured to obtain hand operation information at least related to a posture of an operator. The processor is configured to determine an operation mode of the operator based on the hand operation information, and direct the electronic device to a state corresponding to the operation mode based on an association relationship between the operation mode and a preset operation function of the electronic device.

Another aspect of the present disclosure provides a non-transitory computer-readable storage medium containing computer-executable instructions for, when executed by one or more processors, performing an electronic device operating method applied to an electronic device. The method includes obtaining hand operation information at least related to a posture of an operator, determining an operation mode of the operator based on the hand operation information, and directing the electronic device to a state corresponding to the operation mode based on an association relationship between the operation mode and a preset operation function of the electronic device.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

The following describes the present disclosure in detail with reference to the accompanying drawings.

It should be understood that various modifications may be made to the embodiments disclosed herein. Therefore, the following description should not be construed as limiting the scope of the invention, but merely as examples of the embodiments consistent with the present disclosure. Those skilled in the art would envision other modifications within the scope and spirit of the present disclosure.

The accompanying drawings, which are incorporated in and constitute a part of the specification, illustrate embodiments of the present disclosure, and together with the general description of the disclosure given above and the detailed description of the embodiments given below serve to explain the principle of the present disclosure.

These and other features of the present disclosure will become apparent from the following description of preferred forms of the embodiments given as non-limiting examples with reference to the accompanying drawings.

It should also be understood that although the present disclosure has been described with reference to certain specific examples, those skilled in the art can certainly implement many other equivalent forms of the present disclosure, which have the features recited in the claims and hence are located within the scope of this protection limited hereby.

The above and other aspects, features, and advantages of the present disclosure will become more apparent in view of the following detailed description in conjunction with the accompanying drawings.

Hereafter, specific embodiments of the present disclosure will be described with reference to the accompanying drawings. However, it should be understood that the disclosed embodiments are merely examples of the present disclosure, which may be implemented in various manners. Well-known and/or repetitive functions and structures are not descripted in detail to avoid unnecessary or superfluous details that would obscure the disclosure. Hence, specific structural or functional details disclosed herein are not intended to be limiting, but merely as a basis for the claims and as a representative basis for instructing those skilled in the art to variously employ the present disclosure in any literally appropriate, detailed structure.

The present description may use the phrases such as "in one embodiment", "in another embodiment", "in yet another embodiment", or "in other embodiments", which can refer to one or more of the same or different embodiments consistent with the present disclosure.

An embodiment of the present disclosure provides an electronic device operating method, which can be applied to electronic devices. The electronic device may include different electronic devices such as a mobile phone, a tablet computer (PAD), a laptop computer, a personal computer (PC), etc. The present disclosure does not limit the specific type of the electronic device, as long as the electronic device can collect hand operation information.

Figure 1:
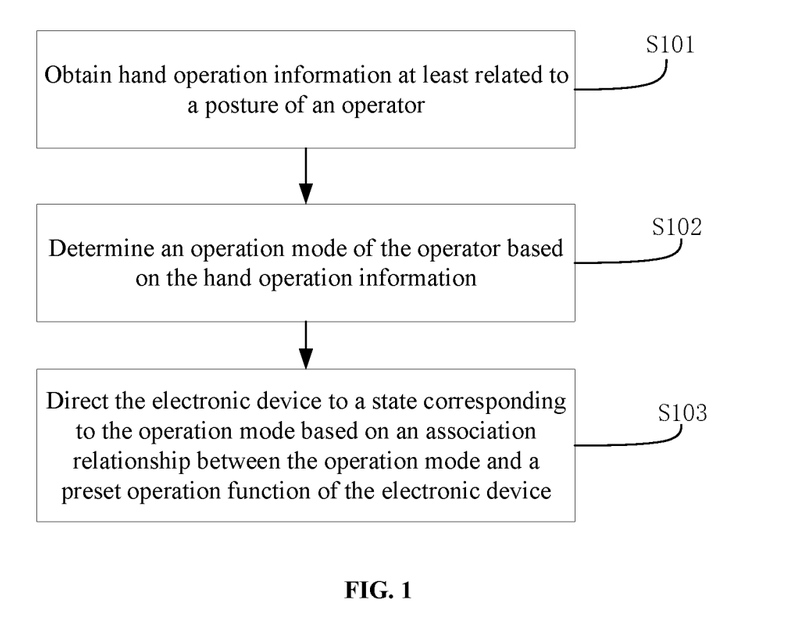
FIG. 1 is a flowchart of an electronic device operating method according to an embodiment of the present disclosure.

FIG. 1 is a flowchart of an electronic device operating method according to an embodiment of the present disclosure. The method will be described in detail below.

101, obtaining hand operation information at least related to a posture of an operator.

In some embodiments, the electronic device may include a display side and a system side. A keyboard and a touchpad may be arranged on the system side, and the touchpad may be closer to the user relative to the keyboard, or the touchpad may be arranged on opposite sides of the keyboard. The touchpad may be used to collect the hand operation information. A display area may also be arranged on the touchpad, and the display area and the display side may display in association, thereby providing a dual-screen display experience for the user.

In some embodiments, the operator may be a main body capable of directing an electronic device, such as a user's hand, or a manipulator for directing an electronic device, or another main body for manipulating an electronic device, which is not limited in the embodiments of the present disclosure. The following takes the operator for directing the electronic device as the user's hand as an example for description.

In some embodiments, the posture of the operator may include one or more of a lifting posture, a pressing posture, a sliding posture, a one-handed posture, a two-handed posture, and a hands-free posture. The lifting posture and the pressing posture may be understood as gestures in which the user's hand is lifted or pressed on the touchpad of the electronic device.

In some embodiments, the electronic device may collect the posture of the operator through one or more of the touchpad, infrared sensor, camera identification device, etc. to obtain the hand operation information, which is not limited in the embodiments of the present disclosure.

102, determining an operation mode of the operator based on the hand operation information.

In some embodiments, the operation mode may include one or more of a lifting operation, a pressing operation, a sliding operation, a one-handed operation, a two-handed operation, and a hands-free operation.

Figure 2:
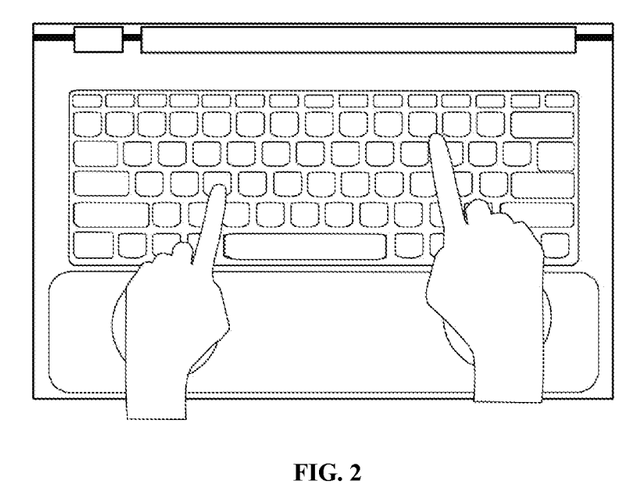
FIG. 2 is a schematic diagram of a first operation of the electronic device operating method according to an embodiment of the present disclosure.
Figure 3:
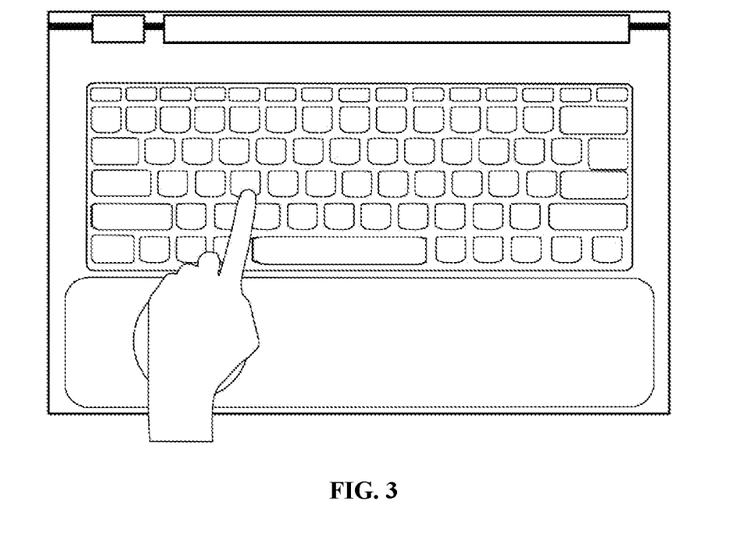
FIG. 3 is a schematic diagram of a second operation of the electronic device operating method according to an embodiment of the present disclosure.
Figure 4:
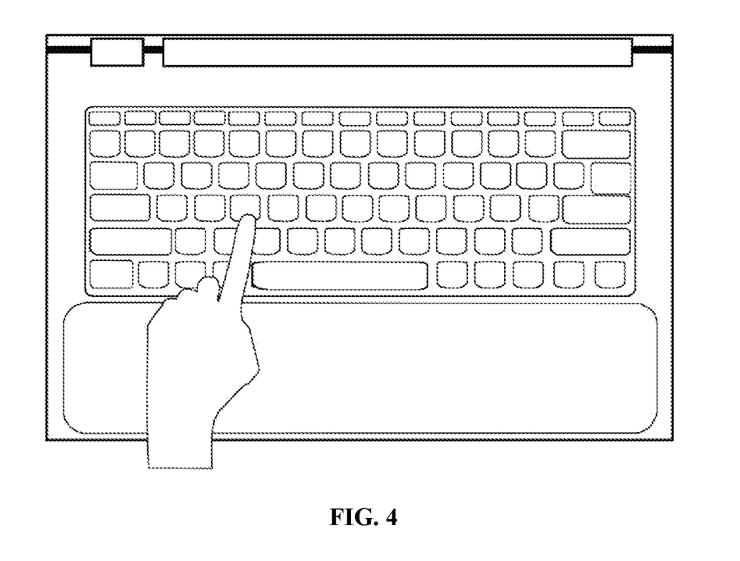
FIG. 4 is a schematic diagram of a third operation of the electronic device operating method according to an embodiment of the present disclosure.

Of course, the operation mode may also be a combination of various modes, such as a two-handed lifting operation, a two-handed pressing operation, a one-handed pressing operation, a one-handed lifting operation, a sliding and pressing operation, etc. As shown in FIG. 2 to FIG. 4, the operation mode shown in FIG. 2 is a two-handed pressing operation, the operation mode shown in FIG. 3 is a one-handed pressing operation, and the operation mode shown in FIG. 4 is a one-handed lifting operation.

103, directing the electronic device to a state corresponding to the operation mode based on an association relationship between the operation mode and a preset operation function of the electronic device.

In some embodiments, the electronic device may store a first association relationship table between the operation mode and the state of the electronic device. In the first association relationship table, different operation modes may respectively correspond to the states of the electronic device. The first association relationship table may be set by the user based on the operating habits, or the first association relationship table may be set when the electronic device leaves the factory, which is not limited in the embodiments of the present disclosure.

In some embodiments, the state of the electronic device may be understood as an input mode, a keyboard layout state, etc. The input mode may be related to the input characters, the language of the input text, and the capitalization of the input text.

For example, when operation mode is a sliding operation, the electronic device may be switched from the current state to an erasing state corresponding to the sliding operation. In another example, when the operation mode is a one-handed pressing operation, the electronic device may be switched from the current keyboard layout state to a keyboard layout state corresponding to the one-handed pressing operation, and the keyboard layout state may be related to the user's input operation habit. Of course, when the operation mode is the two-handed operation, the one-handed operation, etc., different electronic device states corresponding to the operation mode may be set. In this way, it is convenient for the user to realize control of the state of the electronic device only through hand movement, which optimizes the user experience.

More specifically, a target state to be switched by directing the electronic device may be determined in combination with the current state of the electronic device. For example, if the current state of the electronic device is an audio-on state and an operation mode related to controlling the audio on/off of the electronic device is received, the electronic device may be switched to an audio-off state based on the current audio-on state of the electronic device. In another example, if the current state of the electronic device is the audio-off state and an operation mode related to controlling the audio on/off of the electronic device is received, the electronic device may be switched to the audio-on state based on the current audio-off state of the electronic device. The received operation mode related to controlling the audio on and off of the electronic device may be the same or different. Therefore, in the present disclosure, when the received operation mode is the same, the function corresponding to the target state may be switched on and off.

Consistent with the present disclosure, by obtaining the hand operation information and determining the operation mode based on the hand operation information, the electronic device can be directed to a state corresponding to the operation mode, and the electronic device can be directed by making full use of the hand operation information. In this way, various states of the electronic device can be associated with different operation modes, thereby providing users with a better interactive environment and adding new interactive experiences.

In some embodiments, the method may further include, in response to an operation mode related to a pressing operation, directing the electronic device to one or more of a playback state, an on-off state, and a display state of the electronic device corresponding to the operation mode.

In some embodiments, the touchpad of the electronic device may be configured to collect the pressing operation of the user's hand, and determine whether the operation mode is a one-handed pressing operation or a two-handed pressing operation. The one-handed pressing operation and the two-handed pressing operation in the first association relationship table may respectively correspond to different states of the electronic device.

In some embodiments, the playback state may include at least a playback-on state and a playback-off state, the on-off state may include at least an on state and an off state of the electronic device, and the display state may include at least a locked display interface state and an unlocked display interface state.

More specifically, when an operation mode related to the pressing operation is received, the target state to be switched by directing the electronic device may be determined in combination with the current state of the electronic device. For example, when the current state is the playback-on state, the electronic device may be switched to the play-off state based on the operation mode related to the pressing operation. In another example, when the current state is the playback-off state, the electronic device may be switched to the playback-on state based on the operation mode related to the pressing operation. That is, the operation mode related to the pressing operation may be related to the playback state, and the playback state of the electronic device may be switched to a state different from the current state.

In some embodiments, the operation mode may correspond to the one or more states of the electronic device. For example, after the operation mode is determined, both the playback state and the display state of the electronic device may be controlled, thereby further improving the convenience of controlling the electronic device and simplifying the user operation.

In some embodiments, the method may further include the following processes.

201, in response to sliding information in the hand operation information.

202, determining the operation mode is a sliding operation.

In some embodiments, the sliding operation may be understood as the operation in which the user's hand slides a certain distance on the touchpad of the electronic device. The sliding operation may be realized by the user's finger or the user's palm, as long as it is related to the sliding operation of the user's hand.

203, directing the electronic device to an erasing state corresponding to the sliding operation, and erasing the content on the path of the sliding operation.

In some embodiments, the objects to be erased may be images, text, applications, or other objects that can be selected by sliding. For example, when the current state of the electronic device is in input mode, the user may select multiple characters at once through a sliding operation, and erase the multiple characters on the path of the sliding operation. In another example, when the current state of the electronic device is the image processing state, the user may select multiple images at once through a sliding operation, and erase the multiple images on the path of the sliding operation. In another example, when the current state of the electronic device is the state of displaying the desktop, the user may select multiple application programs at once through a sliding operation, and uninstall the multiple application programs on the path of the sliding operation from the electronic device.

In this way, the user can realize the synchronous manipulation of multiple objects based on one sliding operation described above, thereby improving user's processing efficiency of the electronic device.

In some embodiments, the method may further include, in response to an operation interface of obtaining verification information for verifying the user's identity, directing the electronic device to a state of adjusting the input mode of the keyboard corresponding to the operation mode.

In some embodiments, the verification information may be understood as the information sent by any application of the electronic device or the electronic device itself to verify the identity of the user, such as the verification information of the password input issued when the electronic device needs to be unlocked, or the verification information of the user name and password that needs to be verified when operating the application.

In some embodiments, the state of the input mode corresponding to the verification information may be different from the state of the default input mode of the electronic device. For example, the default input mode of the electronic device may be the Chinese input mode. After the verification information is presented on the electronic device, based on the operation mode corresponding to the user's hand operation information, when the user's identity information is verified, the input mode of the keyboard may be adjusted to the English input mode. In this way, the user does not need to manually press the keyboard to switch the input mode, thereby improving the input efficiency.

For example, when the verification information for verifying the user's identity is presented on the operation interface of the electronic device, if the operation mode of two-handed operation is detected at this time, the input mode of the keyboard may be adjusted to the capital letter input mode, and the input mode of the function keys may output numbers. If the operation mode of one-handed operation is detected, the input mode of the keyboard may be adjusted to the input mode of lowercase letters, and the input mode of the function keys may output symbols.

In some embodiments, the information presented on the operation interface of the electronic device, the operation mode, and the state of the electronic device may have a second association relationship table different from the first association relationship table described above. In the second association relationship table, the information presented on the operation interface of the electronic device, the operation mode, and the state of the electronic device may have a mapping relationship. When the information and operation mode presented on the operation interface of the electronic device satisfy the mapping relationship in the second association relationship table, the state of the electronic device may be directed to be a state corresponding to the second association relationship table.

In some embodiments, the second association relationship table may have a higher priority than the first association relationship table. It can be understood that, when the mapping relationship between the information presented on the operation interface of the electronic device and the operation mode in the second association relationship table is satisfied, the state of the electronic device may be directed to a state corresponding to the second association relationship table. When the mapping relationship between the information presented on the operation interface of the electronic device and the operation mode does not satisfy the second association relationship table, the first association relationship table may be called, and the state of the electronic device may be directed to the state corresponding to the operation mode in the first association relationship table.

In some embodiments, the second association relationship table may also be used to represent the mapping relationship of the playback state, the operation mode of the electronic device, and a working state of the electronic device. For example, when the electronic device is in the playback state and the operation mode is obtained at this time, after it is determined that the operation mode and the playback state satisfy the mapping relationship in the second association relationship table, the state of the electronic device may be adjusted to the state corresponding to the second association relationship table.

The following example, in the second association relationship table, the state of the electronic device is in the playback state and the state of the electronic device corresponding to the two-handed operation is the fast-forward playback. Further, the state of the electronic device in the playback state and the state of the electronic device corresponding to the one-handed operation is to increase the playback volume. In this case, when it is obtained that the user's operation mode is the two-handed operation in the playback state, the state of the electronic device can be directed to fast-forward playback. Further, when it is obtained that the user's operation is the one-handed operation in the playback state, the state of the electronic device can be directed to increase the playback volume. It should be noted that the present disclosure does not limit the specific mapping relationship between the playback state, the operation mode, and the working state of the electronic device in the second association relationship table, as long as it meets the user's operating habits and needs. In some embodiments, the specific mapping relationship between the playback state, the operation mode, and the working state of the electronic device in the second association relationship table may have a user-defined configuration to meet the personalized needs of the user. For example, in the playback state, the user may configure the left-hand pressing operation to correspond to fast rewind, configure the right-hand pressing operation to correspond to fast forward, configured the two-handed pressing operation to correspond to pause, etc.

In some embodiments, the method may further include adjusting the layout state of the keyboard of the electronic device based on the operation mode to change the key positions of the keyboard, the layout state being used to represent to position of each key of the keyboard.

In some embodiments, when the keyboard of the electronic device is a virtual keyboard, the position of each key on the keyboard may be dynamically adjusted based on the operation mode. For example, when the user's operation mode is the two-handed operation, the layout state of the keyboard may be adjusted to the default layout state. Further, when the user's operation mode is the one-handed operation, the keyboard may be adjusted from the default layout state to preset layout state. The preset layout state can be customized by the user to adapt to the user's habit, and the security of input can be improved by changing the key positions of the keys.

In some embodiments, the method may further include, in response to the pressing information in the hand operation information, adjusting the layout state of the keyboard of the electronic device based on the pressing information and the preset operation function association to change the key positions of the keyboard. In some embodiments, the layout state may be used to represent the position of each key of the keyboard.

Figure 5:
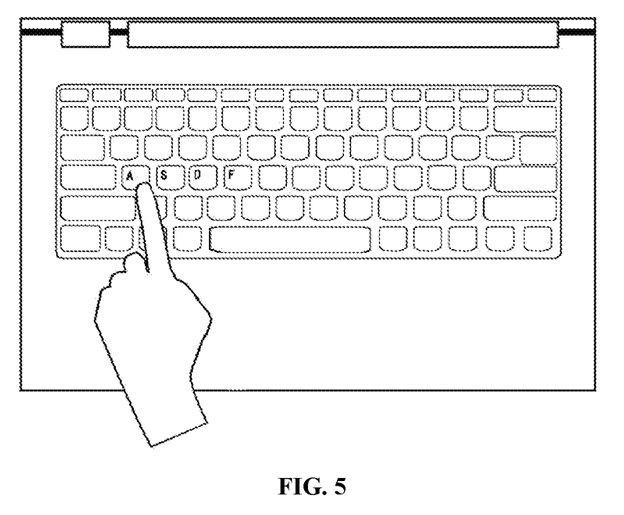
FIG. 5 is a schematic diagram of a fourth operation of the electronic device operating method according to an embodiment of the present disclosure.
Figure 6:
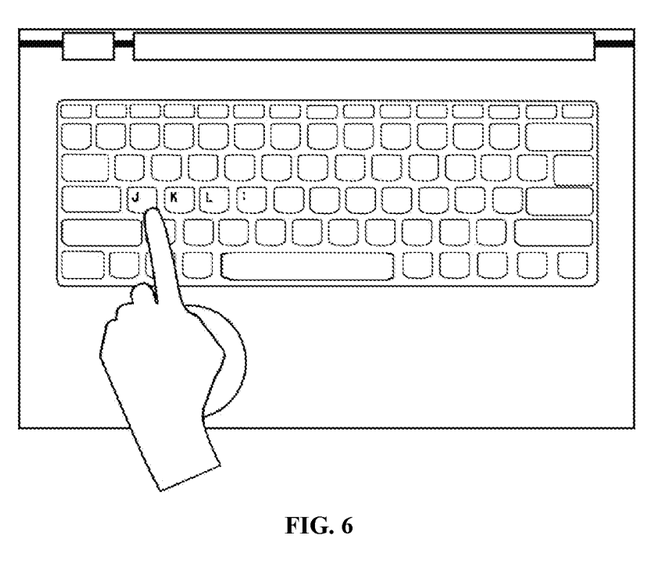
FIG. 6 is a schematic diagram of a fifth operation of the electronic device operating method according to an embodiment of the present disclosure.

In some embodiments, when the hand operation information includes the pressing information, the corresponding operation mode may be a one-handed pressing operation or a two-handed pressing operation. As shown in FIG. 5, when the operation mode is the one-handed lifting operation, the layout state of the keyboard can be adjusted to the default layout state. As shown in FIG. 6, when the operation mode is the one-handed pressing operation, the keyboard can be adjusted from the default layout state to a preset layout state, and the preset layout state may be customized by the user. Of course, the layout state of the keyboard may also be adjusted to the default layout state when the operation mode is one of the two-handed pressing operation, the two-handed lifting operation, and the one-handed lifting operation. The present disclosure does not limit the specific operation mode for adjusting the layout state of the keyboard, and the user can adjust and set the operation mode based on the usage habits.

In some embodiments, the method may further include determining an operation area corresponding to the touchpad of the electronic device based on the hand operation information, and dynamically adjusting an acquisition area and/or display area of the touchpad based on the operation area.

In some embodiments, the touchpad of the electronic device may have an acquisition area and/or a display area. The acquisition area may be used for collecting user's hand operation information, and the display area may be used for an associated display or auxiliary display with the display screen on the display side of the electronic device. The operation area corresponding to the hand operation information may be understood as the area corresponding to the palm of the user, and the operation area is blocked by the palm. Therefore, the acquisition area and/or the display area can be arranged away from the operation area, thereby avoiding the occurrence of false touch and the palm blocking the display.

Figure 7:
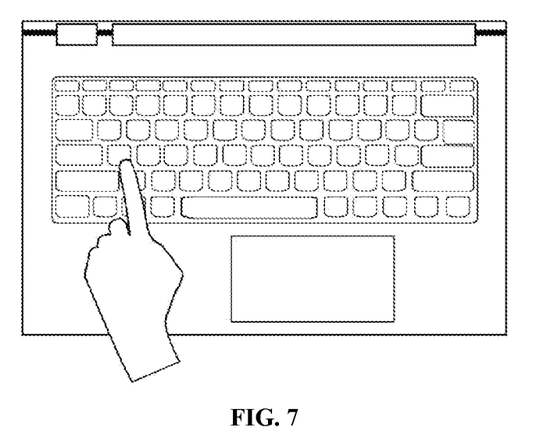
FIG. 7 is a schematic diagram of a sixth operation of the electronic device operating method according to an embodiment of the present disclosure.
Figure 8:
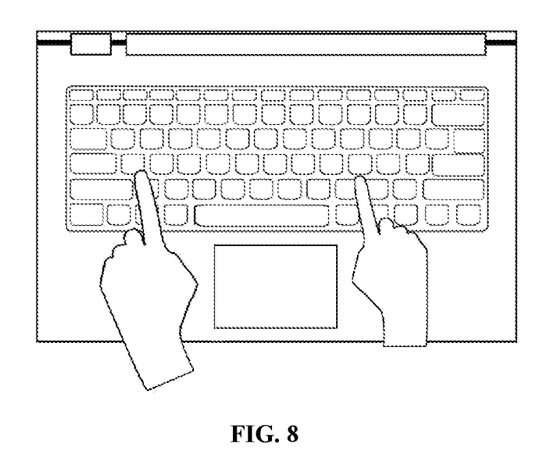
FIG. 8 is a schematic diagram of a seventh operation of the electronic device operating method according to an embodiment of the present disclosure.

Referring to FIG. 7 and FIG. 8. The operation mode shown in FIG. 7 is a one-handed operation. At this time, the acquisition area and/or the display area of the touchpad can be adjusted based on the operation area corresponding to the one-handed operation. The operation mode shown in FIG. 8 is a two-handed operation. At this time, the acquisition area and/or the display area of the touchpad can be appropriately adjusted to a smaller size based on the operation area corresponding to the two-handed operation. In this way, when the operation area changes with the position of the hand, the acquisition area and/or the display area can be dynamically adjusted with the operation area, thereby realizing flexible adjustment of the touchpad.

In some embodiments, the state of the electronic device may include at least a first sub-input mode, a second sub-input mode, and a third sub-input mode corresponding to and different from the keyboard of the electronic device.

In some embodiments, the method may further include switching the keyboard to the first sub-input mode for inputting characters of a first type when it is determined that the operation mode is a single-operator mode; switching the keyboard to the second sub-input mode for inputting characters of a second type when it is determined that the operation mode is a dual-operator mode; and switching the keyboard to the third sub-input mode for inputting characters of a third type when it is determined that the operation mode is an operator-free mode.

In some embodiments, the default input mode of the electronic device may be the Chinese input mode. At this time, the input characters are all Chinese, the first sub-input mode can be understood as an English input mode, the first type of characters is English, and the operator can be understood as a hand, which can be a left hand, a right hand, or the left hand and the right hand. When the collected operation mode is the single-operator mode, that is, the one-handed operation, the input mode of the keyboard may be switched from the Chinese input mode to the English input mode. At this time, whether the one-handed operation is the left-handed operation or the right-handed operation may be further determined. In the case of the left-handed single-handed operation, the input mode of the keyboard may be switched from the Chinese input mode to the English input mode. In the case of the right-handed single-handed operation, the input mode of the keyboard may be switched from the Chinese input mode to the French input mode. The above description is an example of the state of the specific operation modes and the corresponding input modes. The present disclosure does not limit the state of the operation mode and its corresponding input mode, which can be customized by the user.

In some embodiments, the second sub-input mode may be understood as the default Chinese input mode, and the second type of characters may be understood as Chinese. When it is determined that the operation mode is the two-handed operation, the current input mode of the electronic device may be switched to the Chinese input mode. At this time, the current input mode of the electronic device may be determined before switching, and when it is determined that the current input mode is the Chinese input mode, the current input mode may be kept unchanged.

In some embodiments, the third sub-input mode may be understood as a symbol input mode, and the third type of characters may be symbols. The user may lift the palms of both hands away from the touchpad, such that the touchpad cannot collect the hand operation information. At this time, the operation mode may be determined as the operator-free mode, and the input mode of the keyboard may be switched to the symbol input mod.

The above descriptions of the first sub-input mode, the second sub-input mode, and the third sub-input mode are examples, and do not specifically limit the first sub-input mode, the second sub-input mode, and the third sub-input mode. The first sub-input mode may also be a Chinese input mode or a symbol input mode, etc. The state of the input mode corresponding to the operation mode in the present disclosure can be adjusted by the user.

In some embodiments, the method may further include obtaining gesture information at least related to fingers via the touchpad of the electronic device when it is determined that the operation mode is the single-operator mode or the operator-free mode.

In some embodiments, in the case of the one-handed operation mode or the hands-free operation mode, at least one of the user's hands is not pressing on the keyboard. At this time, the fingers that do not press the keyboard may operate on the touchpad, such as a sliding operation, a selection operation, etc. By collecting of the gesture information of fingers on the touchpad, the electronic device can be controlled in various aspects in combination with the gesture information and the input information of the keyboard, which can further improve the user experience.

In some embodiments, the operator may be a palm, and obtaining the hand operation information at least related to the posture of the operator my include obtaining left palm information and right palm information through the touchpad of the electronic device, and determining the hand operation information based on the left palm information and the right palm information.

In some embodiments, the keyboard of the electronic device may be farther away from the user than the touchpad. When the user is operating the electronic device, the user's fingers can be used to control the keyboard. At this time, the palm may correspond to the touchpad, and the touchpad may collect the left palm information and the right palm information to realize keyboard input and control the input mode of the keyboard, thereby improving the convenience and security of the input.

Figure 9:
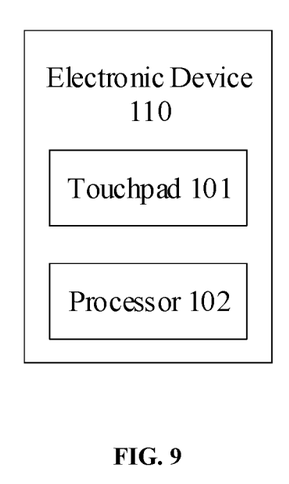
FIG. 9 is a structural block diagram of an electronic device according to an embodiment of the present disclosure.

An embodiment of the present disclosure further provides an electronic device 110. As shown in FIG. 9, the electronic device 110 includes a touchpad 101 and a processor 102. The touchpad 101 may be configured to obtain the hand operation information at least related to the posture of the operator. The processor 102 may be configured to determine the operation mode of the operator based on the hand operation information, and direct the electronic device 110 to a state corresponding to the operation mode based on the association relationship between the operation mode and the preset operation function of the electronic device 110.

Consistent with the present disclosure, by obtaining the hand operation information and determining the operation mode based on the hand operation information, the electronic device 110 can be directed to a state corresponding to the operation mode, and the electronic device 110 can be directed by making full use of the hand operation information. In this way, various states of the electronic device 110 can be associated with different operation modes, thereby providing users with a better interactive environment and adding new interactive experiences.

In some embodiments, the processor 102 may be further configured to, in response to an operation mode related to a pressing operation, direct the electronic device 110 to one or more of a playback state, an on-off state, and a display state of the electronic device 110 corresponding to the operation mode.

In some embodiments, the processor 102 may be further configured to, in response to the sliding information in the hand operation information, determine the operation mode is a sliding operation; and direct the electronic device 110 to an erasing state corresponding to the sliding operation, and erase the content on the path of the sliding operation.

In some embodiments, the processor 102 may be further configured to, in response to an operation interface of obtaining verification information for verifying the user's identity, direct the electronic device 110 to a state of adjusting the input mode of the keyboard corresponding to the operation mode.

In some embodiments, the processor 102 may be further configured to, in response to the pressing information in the hand operation information, adjust the layout state of the keyboard of the electronic device 110 based on the pressing information and the preset operation function association to change the key positions of the keyboard. In some embodiments, the layout state may be used to represent the position of each key of the keyboard.

In some embodiments, the processor 102 may be further configured to determine an operation area corresponding to the touchpad of the electronic device based on the hand operation information, and dynamically adjust an acquisition area and/or display area of the touchpad based on the operation area.

In some embodiments, the state of the electronic device may include at least a first sub-input mode, a second sub-input mode, and a third sub-input mode corresponding to and different from the keyboard of the electronic device 110. The processor 102 may be configured to switch the keyboard to the first sub-input mode for inputting characters of a first type when it is determined that the operation mode is the single-operator mode; switch the keyboard to the second sub-input mode for inputting characters of a second type when it is determined that the operation mode is a dual-operator mode; and switch the keyboard to the third sub-input mode for inputting characters of a third type when it is determined that the operation mode is an operator-free mode.

In some embodiments, the processor 102 may be further configured to obtain gesture information at least related to fingers via the touchpad of the touchpad when it is determined that the operation mode is the single-operator mode or the operator-free mode.

In some embodiments, the operator may be a palm, and the processor 102 may be further configured to obtain the left palm information and the right palm information through the touchpad of the electronic device, and determining the hand operation information based on the left palm information and the right palm information.

An embodiment of the present disclosure further provides a storage medium having a computer program stored thereon. When the computer program is executed by a processor, the steps of the foregoing method for operating the electronic device 110 can be implemented.

Each unit in various embodiments of the present disclosure may be implemented as computer-executable instructions stored in a memory that, when executed by a processor, can implement the corresponding steps. Alternatively, each unit in various embodiments of the present disclosure may be implemented as hardware with the corresponding logical computing capabilities, or implemented as a combination of software and hardware (firmware). In some embodiments, the processor may be implemented as any one of FPGA, ASIC, DSP chip, system on chip (SOC), MPU (such as but not limited to Cortex), etc. The processor may be communicatively connected to the memory and configured to execute the computer-executable instructions stored therein. The memory may include read-only memory (ROM), flash memory, random-access memory (RAM) such as dynamic random-access memory (DRAM) or synchronous dynamic random-access memory (SDRAM), or Rambus DRAM, static memory (e.g., flash memory, static random-access memory), etc., on which computer-executable instructions can be stored in any format. The computer-executable instructions can be accessed by a processor, read from ROM or any other suitable storage location, and loaded into RAM for execution by the processor to implement the electronic device operating method according to various embodiments of the present disclosure.

It should be noted that modules of the system of the present disclosure are logically divided according to their functions. These modules are provided for the purposes of illustration, and not intended to limit the scope of the present disclosure. These modules may be re-divided or combined according to different requirements. For example, some modules may be combined into a single module, or further divided into more sub-modules.

Various modules of the present disclosure may be implemented by hardware, software running in one or more processors, or a combination of them. For persons having ordinary skills in the art, some or all of the functions of the modules of the present disclosure may be implemented by a microprocessor or a digital signal processor (DSP). The present disclosure may also be implemented as a device or a program running in a device (e.g., a computer program and a product with computer programs) that perform a part of, or all of the methods described herein. Such kind of programs may be stored on a computer readable medium, or may be in a form of one or more signals. Such signals may be downloaded from an Internet website, provided on a carrier signal, or provided in any other forms. In addition, the present invention can be implemented by means of a device comprising a plurality of different components. In a claim in which a plurality of components are listed, the plurality of such components can be embodied by the same component item. The use of the terms "first", "second", "third" and the like does not represent any order. Such terms can be interpreted as names.

In addition, although the exemplary embodiments have been described herein, their scope includes any and all embodiments having equivalent elements, modifications, omissions, combinations (e.g., solutions in which various embodiments intersect), adaptations or changes based on the present disclosure. Elements in the claims will be broadly interpreted on the basis of the language used in the claims, and are not limited to the examples described in this specification or during the implementation of the present disclosure, and the examples thereof will be interpreted to be non-exclusive. Therefore, this specification and the examples are intended to be considered to be exemplary only, and the true scope and spirit will be indicated by the full range of the following claims and equivalents thereof.

The above description is intended to be illustrative and not limiting. For example, the above examples (or one or more solutions thereof) may be used in combination with each other. For example, other embodiments may be used by those of ordinary skill in the art upon reading the above description. In addition, in the above specific implementations, various features may be grouped together to simplify the present disclosure. This should not be interpreted as an intention that an unclaimed disclosed feature is essential for any claim. On the contrary, the subject matter of the present disclosure may be less than all features of a particular disclosed embodiment. Therefore, the following claims are hereby incorporated into the detailed implementations as examples or embodiments, wherein each claim is independently used as a separate embodiment, and it is considered that these embodiments may be combined with each other in various combinations or arrangements. The scope of the present disclosure should be determined with reference to the full scope of the appended claims and equivalents to which these claims are entitled.

The above embodiments are only exemplary embodiments of the present disclosure, and are not intended to limit the present disclosure. The protection scope of the present disclosure is defined by the claims. Various modifications or equivalent substitutions may be made to the present disclosure by those skilled in the art within the essence and the protection scope of the present disclosure, and such modifications or equivalent substitutions should be regarded as falling into the protection scope of the present disclosure as well.

What is claimed is:

1. An electronic device operating method applied to an electronic device, comprising:
    obtaining hand operation information related to a posture of an operator;
    determining an operation mode of the operator based on the hand operation information;
    directing the electronic device to a state corresponding to the operation mode based on an association between the operation mode and a preset operation function of the electronic device; and
    in response to pressing information in the hand operation information, adjusting a layout state of the keyboard of the electronic device based on the association relationship between the pressing information and the preset operation function to change key positions of the keyboard, the layout state being used to represent the position of each key of the keyboard.

2. The method of claim 1 further comprises:
    in response to a pressing-related operation mode, directing the electronic device to one or more of a playback state, an on-off state, and a display state of the electronic device corresponding to the operation mode.

3. The method of claim 1 further comprises:
    in response to sliding information in the hand operation information, determining the operation mode is a sliding operation; and
    directing the electronic device to an erasing state corresponding to the sliding operation, and erasing content on a path of the sliding operation.

4. The method of claim 1 further comprises:
    in response to an operation interface of obtaining verification information for verifying a user's identity, directing the electronic device to a state of adjusting an input mode of a keyboard corresponding to the operation mode.

5. The method of claim 1 further comprises:
    determining an operation area corresponding to a touchpad of the electronic device based on the hand operation information, and dynamically adjusting an acquisition area and/or a display area of the touchpad based on the operation area.

6. The method of claim 1, wherein:
    the state of the electronic device further includes a first sub-input mode, a second sub-input mode, and a third sub-input mode corresponding to and different from the keyboard of the electronic device; and
    the method further comprises:
    switching the keyboard to the first sub-input mode for inputting characters of a first type in response to determining the operation mode is a single-operator mode;
    switching the keyboard to the second sub-input mode for inputting characters of a second type in response to determining the operation mode is a dual-operator mode; and
    switching the keyboard to the third sub-input mode for inputting characters of a third type in response to determining the operation mode is an operator-free mode.

7. The method of claim 6 further comprising:
    in response to determining the operation mode is the single-operator mode or the operator-free mode, obtaining gesture information at least related to fingers via the touchpad of the electronic device.

8. The method of claim 1, wherein:
    the operator is a palm; and
    obtaining the hand operation information at least related to the posture of the operator includes:
    obtaining left palm information and right palm information through the touchpad of the electronic device; and
    determining the hand operation information based on the left palm information and the right palm information.

9. An electronic device, comprising:
    a touchpad configured to obtain hand operation information related to a posture of an operator; and
    a processor configured to determine an operation mode of the operator based on the hand operation information, direct the electronic device to a state corresponding to the operation mode based on an association relationship between the operation mode and a preset operation function of the electronic device, and in response to pressing information in the hand operation information, adjust a layout state of the keyboard of the electronic device based on the association relationship between the pressing information and the preset operation function to change key positions of the keyboard, the layout state being used to represent the position of each key of the keyboard.

10. The electronic device of claim 9, wherein the processor is further configured to:
    in response to a pressing-related operation mode, direct the electronic device to one or more of a playback state, an on-off state, and a display state of the electronic device corresponding to the operation mode.

11. The electronic device of claim 9, wherein the processor is further configured to:
    in response to sliding information in the hand operation information, determine the operation mode is a sliding operation; and
    direct the electronic device to an erasing state corresponding to the sliding operation, and erasing content on a path of the sliding operation.

12. The electronic device of claim 9, wherein the processor is further configured to:
    in response to an operation interface of obtaining verification information for verifying a user's identity, direct the electronic device to a state of adjusting an input mode of a keyboard corresponding to the operation mode.

13. The electronic device of claim 9, wherein the processor is further configured to:
    determine an operation area corresponding to the touchpad of the electronic device based on the hand operation information, and dynamically adjust an acquisition area and/or a display area of the touchpad based on the operation area.

14. The electronic device of claim 9, wherein:

the state of the electronic device further includes a first sub-input mode, a second sub-input mode, and a third sub-input mode corresponding to and different from the keyboard of the electronic device; and the processor is further configured to:

switch the keyboard to the first sub-input mode for inputting characters of a first type in response to determining the operation mode is a single-operator mode;

switch the keyboard to the second sub-input mode for inputting characters of a second type in response to determining the operation mode is a dual-operator mode; and switch the keyboard to the third sub-input mode for inputting characters of a third type in response to determining the operation mode is an operator-free mode.

15. The electronic device of claim 14, wherein the processor is further configured to:

in response to determining the operation mode is the single-operator mode or the operator-free mode, obtain gesture information related to fingers via the touchpad of the electronic device.

16. The electronic device of claim 9, wherein:

the operator is a palm; and the processor is further configured to:

obtain left palm information and right palm information through the touchpad of the electronic device; and determine the hand operation information based on the left palm information and the right palm information.

17. A non-transitory computer-readable storage medium containing computer-executable instructions for, when executed by one or more processors, performing an electronic device operating method applied to an electronic device, the method comprising:

obtaining hand operation information related to a posture of an operator;

determining an operation mode of the operator based on the hand operation information;

directing the electronic device to a state corresponding to the operation mode based on an association relationship between the operation mode and a preset operation function of the electronic device; and in response to pressing information in the hand operation information, adjusting a layout state of the keyboard of the electronic device based on the association relationship between the pressing information and the preset operation function to change key positions of the keyboard, the layout state being used to represent the position of each key of the keyboard.

18. The non-transitory computer-readable storage medium of claim 17, the method further comprising:

in response to a pressing-related operation mode, directing the electronic device to one or more of a playback state, an on-off state, and a display state of the electronic device corresponding to the operation mode.

\* \* \* \* \*